United States Patent [19]
Daniels

[11] Patent Number: 6,058,301
[45] Date of Patent: May 2, 2000

[54] CELLULAR FRAUD PREVENTION USING SELECTIVE ROAMING

[75] Inventor: David Leighton Daniels, Placentia, Calif.

[73] Assignee: AirTouch Communications, Inc., San Francisco, Calif.

[21] Appl. No.: 08/758,593

[22] Filed: Nov. 27, 1996

[51] Int. Cl.⁷ .................................................. H04Q 7/38
[52] U.S. Cl. ............................ 455/411; 455/433; 380/23
[58] Field of Search .................................. 455/410, 411, 455/418, 422, 432, 433; 379/189; 380/23, 25; 340/825.34

[56] References Cited

U.S. PATENT DOCUMENTS

| | | | |
|---|---|---|---|
| 3,579,186 | 5/1971 | Dunham et al. | 382/121 |
| 4,263,595 | 4/1981 | Vogel | 342/44 |
| 4,264,782 | 4/1981 | Konheim | 380/25 |
| 4,284,851 | 8/1981 | Schweitzer et al. | 379/189 |
| 4,626,845 | 12/1986 | Ley | 340/825.48 |
| 4,756,020 | 7/1988 | Fodale | 379/112 |
| 4,860,352 | 8/1989 | Laurance | 380/23 |
| 4,893,330 | 1/1990 | Franco | 379/91.02 |
| 4,906,988 | 3/1990 | Copella | 340/825.34 |
| 5,091,942 | 2/1992 | Dent | 380/46 |
| 5,124,984 | 6/1992 | Engel | 370/230 |
| 5,148,472 | 9/1992 | Freese et al. | 455/408 |
| 5,237,612 | 8/1993 | Raith | 380/23 |
| 5,239,294 | 8/1993 | Flanders et al. | 340/825.34 |
| 5,249,230 | 9/1993 | Mihm, Jr. | 380/23 |
| 5,299,263 | 3/1994 | Beller et al. | 380/30 |
| 5,309,501 | 5/1994 | Kozik et al. | 455/410 |
| 5,335,278 | 8/1994 | Matchett et al. | 380/23 |
| 5,345,595 | 9/1994 | Johnson | 455/410 |
| 5,420,908 | 5/1995 | Hodges et al. | 455/411 |
| 5,541,977 | 7/1996 | Hodges et al. | 455/411 |
| 5,668,875 | 9/1997 | Brown et al. | 380/23 |
| 5,670,950 | 9/1997 | Otsuka | 455/411 |
| 5,799,249 | 8/1998 | Kennedy, III et al. | 455/411 |
| 5,839,063 | 11/1998 | Lee | 455/410 |

*Primary Examiner*—Willis R. Wolfe
*Attorney, Agent, or Firm*—Gates & Cooper

[57] ABSTRACT

A method of preventing roaming fraud in cellular telephone systems using different levels of roaming privileges for individual subscribers. When the subscriber initiates a call in a foreign service area that exceeds their roaming privileges, an authentication method is used to verify the identity of the roaming subscriber.

31 Claims, 7 Drawing Sheets

CELLULAR FRAUD PREVENTION USING SELECTIVE ROAMING

BACKGROUND OF THE INVENTION

1. Field of the Invention

This invention relates in general to a method of preventing cellular telephone fraud, and more specifically to a method of preventing cellular phone fraud using a pre-authorization technique for subscriber roaming privileges.

2. Description of Related Art

Cellular telephones combine the mobility of the radio link and the world-wide land telephone network to provide a communication link to any other telephone in the world. However, as cellular phones have become more prevalent throughout the country, fraud has become a major problem. Cellular fraud robs service providers of hundreds of millions of dollars every year. Like all crimes, there are several varieties of cellular fraud, including "cloning."

Cloning fraud, which occurs when a legitimate subscriber's mobile identification number/electronic serial number (MIN/ESN) combination is used for illegal purposes, is among the most sophisticated and difficult forms of fraud to prevent. Often, the pirate will use simple electronic devices to "capture" the legitimate MIN/ESN combination during its transmission by radio frequency (RF). In these cases, the legitimate subscriber often does not know fraud is being committed with his or her MIN/ESN combination until they receive their bill. This is currently the most popular method of gaining illegal access to a cellular system, because the legitimacy of the stolen MIN/ESN combinations makes cloning difficult to catch.

Often, cloning fraud occurs outside of the home area of the subscriber. Once the MIN/ESN information has been cloned, the MIN/ESN combination is valid for access to the cellular telephone system anywhere. Roamer fraud is committed by a local thief using a MIN/ESN imported from another service area, and thus not representing a true roaming subscriber. The exploited MIN/ESN is usually gathered through the use of a MIN/ESN reader in a home service area for the cellular phone.

There are certain steps that can be taken to prevent cloning fraud. For example, U.S. Pat. No. 5,249,230 discloses a "challenge-response" system, wherein the cellular system "challenges" a cellular phone subscriber prior to granting access. The subscriber must manually "respond" to the challenge by entering a Personal Identification Number (PIN) or other code that is then verified against a centralized database maintained by the cellular system. However, this method is not attractive to most subscribers since it requires additional work and inconvenience.

In another example, U.S. Pat. No. 5,239,294 discloses a technique that encrypts a PIN that is permanently programmed into the cellular phone, wherein the PIN is automatically transmitted to the cellular network during call setup. However, this method is expensive to implement, and is still subject to cloning, since the cloner need not discriminate between encrypted and unencrypted PINs to merely repeat a sequence of numbers observed being transmitting to the cellular system.

Call pattern monitoring is another method used to prevent cellular phone fraud. This method works because most subscribers call only a specific set of phone numbers. When a call for a subscriber falls outside of that usual group, a challenge-response action can be initiated by the service provider. However, for new subscribers who have no previous calling history, or for subscribers who have a wide range of calling patterns, this method is ineffective.

It can be seen, then, that there is a need for more effective techniques for preventing cellular phone fraud. Furthermore, such techniques must be easy and inexpensive to implement, and must not put unacceptable demands on subscribers.

SUMMARY OF THE INVENTION

To overcome the limitations in the prior art described above, and to overcome other limitations that will become apparent upon reading and understanding the present specification, the present invention discloses a powerful and highly productive method for preventing roaming fraud. The present invention uses different levels of roaming privileges for individual subscribers. The present invention also provides a method for authenticating subscribers when the subscriber initiates a call in a foreign service area that exceeds their roaming privileges.

One object of the present invention is to prevent cellular fraud by use of authentication techniques for roaming subscribers. Another object of the present invention is to make the authentication technique as convenient and inexpensive to the subscribers as possible.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method for preventing cellular fraud by restricting roaming privileges to cellular telephone subscribers, and requiring authentication from those subscribers when the subscriber initiates a call that exceeds their roaming privileges.

Figure 1:
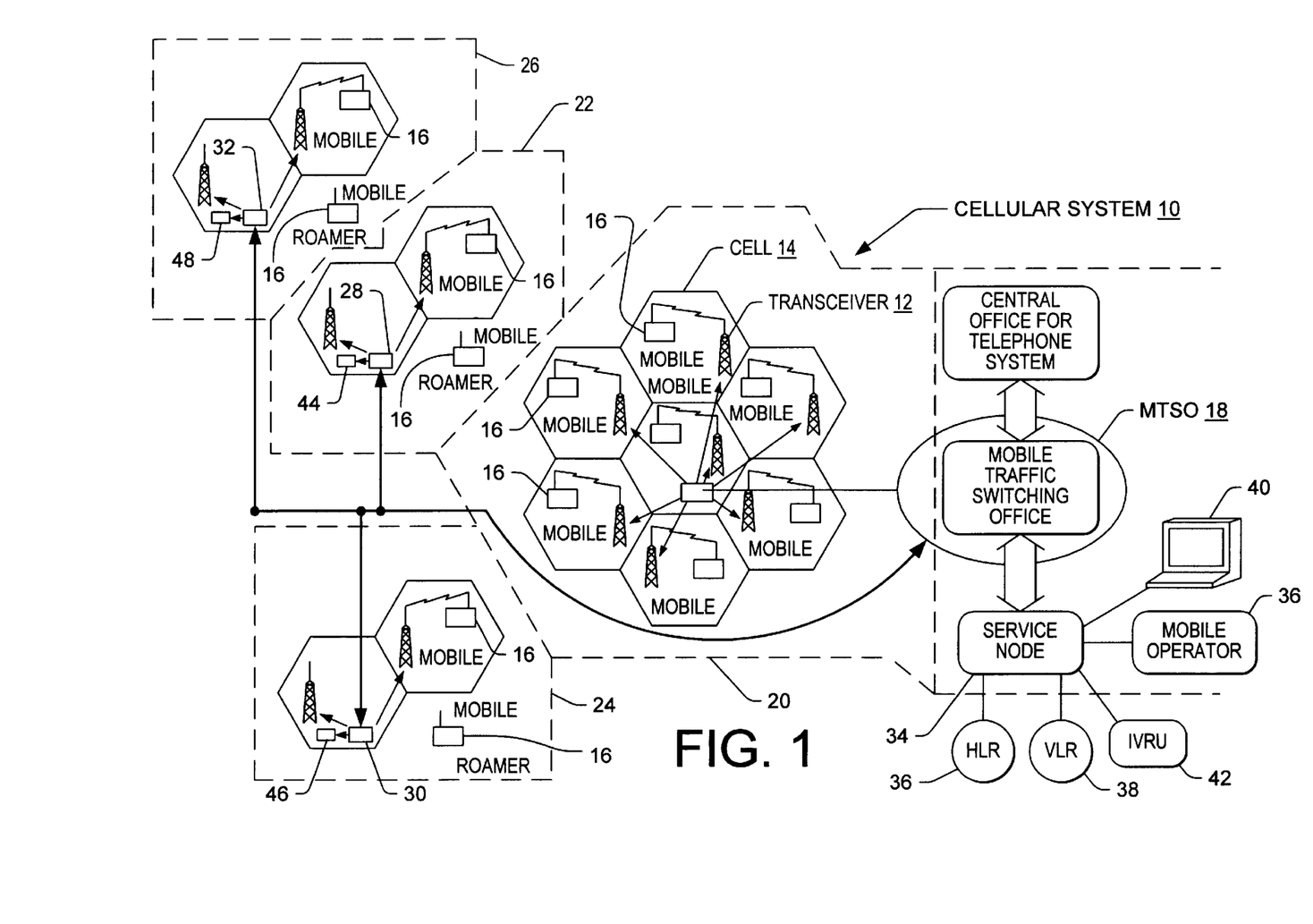
FIG. 1 is a block diagram of an exemplary embodiment of the cellular telephone system according to the present invention.

FIG. 1 is a diagram of a typical cellular telephone system 10. The basic concept of the cellular telephone system 10 is to increase the availability of mobile telephone service, which always has been a scarce luxury, by reducing the area covered by a transceiver 12 by reducing the power of transmission. In this way, concentrated areas of population can have more transceivers 12, and thus more channels, because each transceiver 12 handles a given number of conversations. In addition, because the transceivers 12 cover less area, the same frequency can be re-used in a common geographical area.

Within a cellular telephone system 10, a service area is divided into regions called cells 14, each of which has the necessary equipment to switch, transmit, and receive calls to and from any cellular phone 16 located in the cell. A transceiver 12 in each cell 14 can transmit and receive on a plurality of FM channels in a specified frequency range simultaneously.

Each cell 14 has at least one setup channel dedicated to signaling between the cell 14 and cellular phones 16 within the cell 14. The remaining channels are used for conversation. Each channel may be re-used between cells 14, so long as the re-use factor avoids interference by allowing channel re-use in cells 14 that are not adjacent to one another, and are far enough apart to avoid excessive interference. Thus, a system 10 with a relatively small number of subscribers can use large cells 14, and as demand grows, the cells 14 are divided into smaller ones.

A cellular telephone 16 consists of a control unit, a transceiver, and appropriate antennas. The transceiver contains circuits that can tune to any of the channels assigned to the cellular system 10. Each cellular telephone 16 has a unique electronic serial number (ESN). Additionally, each cellular telephone 16 is assigned a 10-digit telephone number, known as a mobile identification number (MIN).

Cells 14 are interconnected and controlled by a central Mobile Telecommunications Switching Office (MTSO) 18, which is basically a telephone switching office as far as hardware is concerned, but includes a substantial amount of additional digital equipment programmed for cellular control. The MTSO 18 not only connects the system 10 to the land telephone network, but also records call information for billing purposes.

The cellular telephone system 10 of FIG. 1 is made up of a plurality of service areas 20, 22, 24, and 26 that may (or may not) be operated by different cellular service providers or carriers. Generally, each of the different service areas 20, 22, 24, and 26, is controlled by a corresponding local MTSO 18, 28, 30, and 32, respectively, and each of the service areas 20, 22, 24, and 26 is identified by a System Identification Number (SID). All cellular phones store an SID entry in their memory that identifies the "home" service area for the cellular phone 16. For example, as a cellular phone 16 travels from its "home" service area 20 to another service area 22, the "foreign" service area 22 provides the cellular services to the cellular phone 16, which is then known as a "roamer" in the foreign service area 22.

Generally, agreements between service providers allow for unrestricted roaming by their respective subscribers. Charges incurred by the roamer are transmitted back to the "home" service provider, which pays the "foreign" service provider and then, in turn, bills the subscriber. Of course, if the roamer is fraudulent, the "home" service provider cannot charge the subscriber and thus must absorb the loss itself. The losses from roaming fraud are estimated to be in the tens of millions of dollars each year. The fact that roamer fraud causes the "home" service provider to lose money, rather than just providing free service, is a powerful impetus behind the development of the present invention.

In the prior art, all subscribers default to having roaming privileges, unless a roamer restriction is specifically requested. A blanket roaming privilege extends to anywhere a valid carrier-to-carrier roamer agreement exists in the U.S., Canada, and parts of Mexico. These roamer privileges are granted even to those subscribers that are safety or security conscious and who rarely use the phone, much less roam from their home service area.

In the present invention, policy changes are instituted to restrict roaming privileges, and automated systems are provided to authenticate roaming subscribers. As a result, only those subscribers with an expressed need for roaming privileges are granted such privileges. Furthermore, depending on the restrictions in place for the subscriber, automated authentication may occur to verify the identity of the roaming subscriber.

The present invention identifies the subscriber's specific individual roaming needs and provides automated authentication controls to create easy access to roaming, yet reduces overall exposure to roaming fraud. Under the present invention, seamless roaming is available for all valid subscribers who have the need for such roaming. In fact, seamless roaming is enhanced due to a probable reduction in the need for temporary suspension of roaming privileges on a market-by-market basis due to fraudulent use.

Although the percentage is different in each market, preliminary evidence suggests that the majority of subscribers never roam from their home service area. Of those subscribers who occasionally roam, it is estimated that 75% to 85% limit their roaming to contiguous service areas or a regional service area close to their home service area. This leaves a mere 5% to 10% of subscribers who roam to distant locations within North America. The present invention customizes roaming policies to better reflect roaming demographics and institutes automated authentication when necessary to better cope with a serious and growing roaming fraud problem.

The first step in implementing the present invention is to collect information reflecting the demographics of roaming subscribers. Billing information obtained from the MTSO 18 contains exact data on which subscribers roam, where they roam to, and how often they roam. This information can be extracted, collected, and analyzed using a computer system. Once the information has been analyzed, the service provider can differentiate roamer treatment and status on a custom basis to meet each subscriber's unique needs.

In the present invention, some subscribers are prevented from roaming, possibly due to past fraudulent use of the MIN/ESN of the cellular phone 16, or because of bad credit histories, or because of some other reason. Other subscribers with no roaming history may require authentication prior to being granted roaming privileges in selected foreign service areas. Still other subscribers may be frequent roamers with an established credit history and thus can be allowed to roam everywhere in North America, without the need for additional authentication. Less frequent roaming subscribers may be allowed to roam in specific service areas across North America. Finally, other subscribers may be only allowed to roam in foreign service areas contiguous to their home service area.

As a result of the above definitions, a large number of subscribers may be required to periodically authenticate while roaming in foreign service areas, in accordance with the teachings of the present invention. For example, if a subscriber from service area 20 without sufficient roaming privileges uses their cellular phone 16 in a foreign service area 22, then the MTSO 28 in service area 22 recognizes, from the MIN of the cellular phone 16, that the cellular phone 16 is a roamer. The MTSO 28 identifies the MTSO 18 of the home service area 20 using the SID of the cellular phone 16, and transmits a message to the MTSO 18 in the home service area 20 requesting validation for the roaming cellular phone 16, generally using an SS7 or IS-41 connection.

The MTSO 18 passes the validation request to a service node 34 connected thereto, wherein the service node 34 comprises a computer that may have fixed and/or removable data storage devices 36 and 38, operator positions or terminals 40, and interactive voice response units (IVRUs) 42 attached thereto. Those skilled in the art will recognize that any combination of the above components, or any number of different components, peripherals, and other devices, may be used with the service node 34.

The use of such service nodes 34 attached to MTSOs or COs (central offices) is well known in the art for use with applications such as voice mail, voice recognition, cable TV pay-per-view, etc. Of course, in the present invention, the service node 34 is specially configured and programmed for use in authenticating roaming cellular phones 16.

The present invention is generally implemented using one or more computer programs executed by the service node 34. Generally, the computer programs are all tangibly embodied in a computer-readable medium, e.g., one or more of the fixed and/or removable data storage devices 36 and 38, including their associated media such as diskettes, tapes, etc. Moreover, the computer programs executed by the service node 34 are all comprised of instructions which, when read and executed by the service node 34, causes the service node 34 to perform the steps necessary to implement and/or use the present invention. The computer programs may be loaded from the data storage devices 36 and/or 38 into the memory of the service node 34 for use during actual operations of the authentication method.

In accordance with the instructions of the computer programs, the service node 34 checks to see if the cellular phone 16 has sufficient roaming privileges. The service node 34 checks a database stored in the data storage units 36 and 38 to determine the roaming privileges of the cellular phone 16. Preferably, the database comprises both a Home Locator Register (HLR) 36 for storing roaming information (roaming privileges and identifying information) for subscribers of the home service area 20 and a Visitor Locator Register (VLR) 38 for storing roaming information (validation and validation period) for subscribers of the foreign service areas 22, 24, or 26, that are currently roaming in the home service area 20.

If a check of the Home Locator Register 36 in the service node 34 indicates that the cellular phone 16 has no roaming privileges, then the service node 34 responds with a denial signal to the MTSO 28 in the foreign service area 22. This denial signal instructs the foreign service area 22 to deny cellular services to the roaming cellular phone 16, with an implicit understanding that the home service area 20 will not absorb any losses if the foreign service area 22 ignores the denial.

If a check of the Home Locator Register in the service node 34 indicates that the cellular phone 16 has sufficient roaming privileges, then the service node 34 responds with an authorization signal to the MTSO 28 in the foreign service area 22. This authorization signal authorizes the foreign service area 22 to provide roaming services to the roaming cellular phone 16, with an implicit understanding that the home service area 20 will absorb any losses if the roaming cellular phone 16 has been cloned.

If a check of the Home Locator Register 36 in the service node 34 indicates that the cellular phone 16 does not have sufficient roaming privileges, but is not prevented from roaming, then the service node 34 responds with an authentication request signal to the MTSO 28 in the foreign service area 22. It is envisioned that each service area 20, 22, 24, and 26, has its own service node 34, 44, 46, and 48, respectively. The MTSO 28 in the foreign service area 22 passes the authentication request signal to the service node 44 connected thereto, wherein the service node 44 in the foreign service area 22 performs an authentication method using identification information received from the service node 34 in the home service area to determine whether the cellular phone 16 has been cloned. In the preferred embodiment, one or more authentication methods could be used, including tiered levels of authentication if the subscriber fails an initial authentication attempt, as described in more detail below.

If the roaming cellular phone 16 successfully authenticates, then, by agreement between the service providers 20 and 22, no further authentication may be required for the roaming cellular phone 16 for a specified period of time, e.g., 24 hours or 48 hours or some other period. Generally, this information is stored in the Visitor Locator Register of the service node 44 in the foreign service area 22, so that subsequent call attempts by the roaming cellular phone 16 within the specific period do not require communication with the service node 34 in the home service area 20, until after the expiration of the validation period.

If the roaming cellular phone 16 does not successfully authenticate, a next higher level of a multi-level authentication method could be used. Failing all attempts to authenticate the roaming cellular phone 16 would result in the denial of roaming cellular services by the foreign service area 22.

Note that the use of an authentication method only occurs if the roaming cellular phone 16 is restricted, at some level, from roaming by the home service area 20. As a result, the present invention minimizes the inconveniences to subscribers. On the other hand, if the subscriber roams more frequently, the roaming restrictions can be lessened or the level of roaming privileges increased simply by making a request to the service provider for their home service area 20.

FIGS. 2A–2F together are a flowchart that illustrates the logic performed by the service node 34 to validate roaming subscribers in accordance with the present invention. Those skilled in the art will recognize that service nodes 44, 46, and 48 perform similar functions.

Figure 2A:
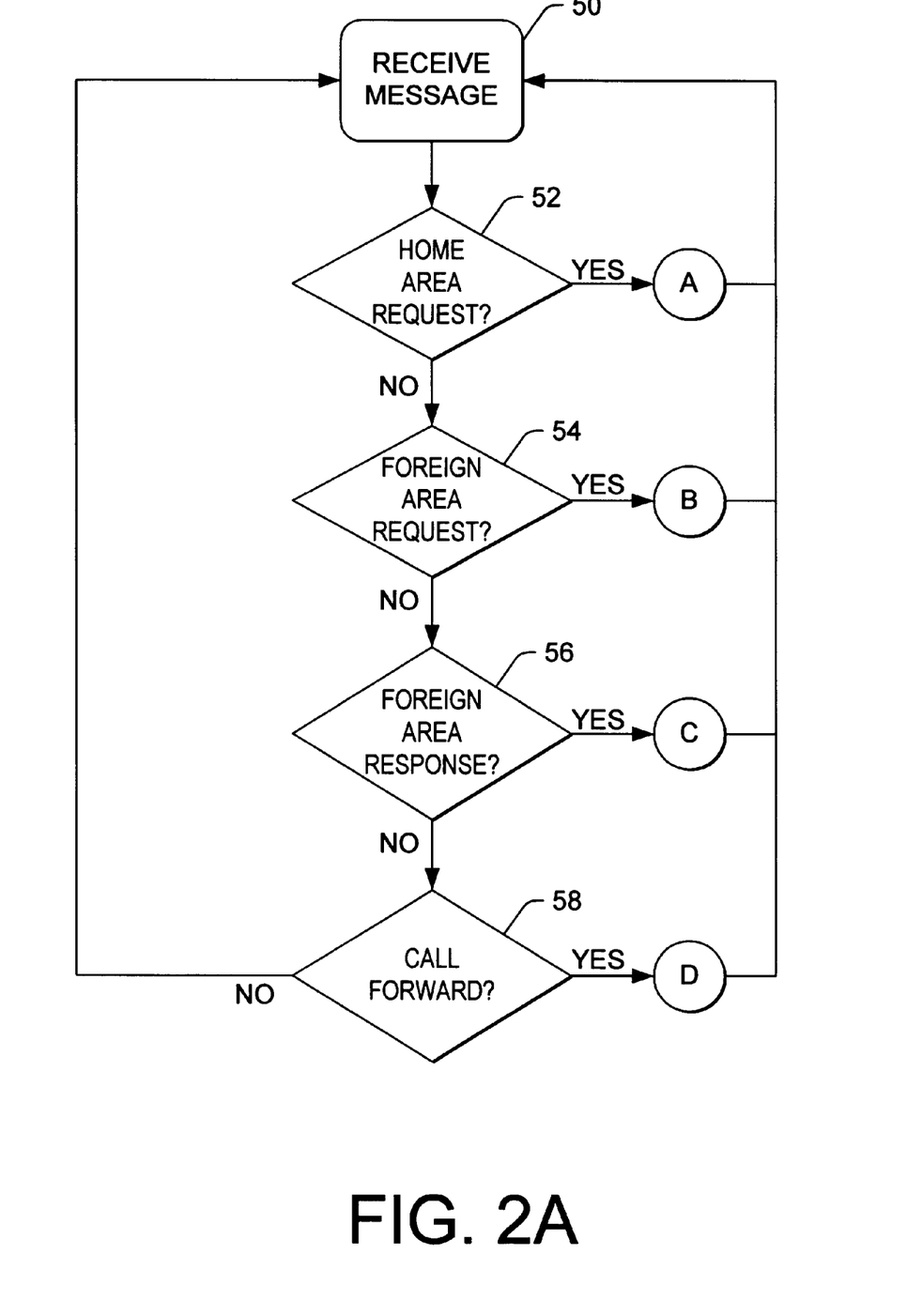
FIGS. 2A–2F together are a flowchart illustrating the steps performed in the authentication function of the present invention.

Block 50 represents the service node 34 in the home service area 20 receiving one of four messages via the MTSO 18: (1) a request to validate a roaming cellular phone 16 in the home service area 20; (2) a request to validate a roaming cellular phone in a foreign service area 22, 24, or 26; (3) a response from a foreign service area 22, 24, or 26, to a request made by the service node 34 to validate the roaming cellular phone 16 in the home service area 20; or (4) a call forwarding response for the roaming cellular phone 16 from a foreign service area 22, 24, or 26, to a request made by the service node 34 to authenticate the roaming cellular phone 16 in the foreign service area 22, 24, or 26.

Those skilled in the art will recognize that the service node 34 could communicate with the MTSOs or service nodes in other service areas via the MTSO 18, using SS7 signalling or IS41 protocols or some other protocol or signalling method. Alternatively, those skilled in the art will recognize that the service node 34 could be directly connected with the MTSOs or service nodes in other service areas.

Block 52 is a decision block that represents the service node 34 determining whether the message is a request to validate a roaming cellular phone 16 in the home service area 20. If so, control transfers to FIG. 2B via "A"; otherwise control transfers to block 54.

Block 54 is a decision block that represents the service node 34 determining whether the message is a request for authorization from a foreign service area 22, 24, or 26 for the roaming cellular phone 16 in the foreign service area 22, 24, or 26. If so, control transfers to FIG. 2C via "B"; otherwise control transfers to block 56.

Block 56 is a decision block that represents the service node 34 determining whether the message is a response from a foreign service area 22, 24, or 26, to a previous request made by the service node 34 to authorize cellular services for the roaming cellular phone 16 in the home service area 20. If so, control transfers to FIG. 2D via "C"; otherwise control transfers to block 58.

Block 58 is a decision block that represents the service node 34 determining whether the message is a call forward from a foreign service area 22, 24, or 26, in response to a previous request for the same made by the service node 34 to authorize cellular services for the roaming cellular phone 16 in the foreign service area 22, 24, or 26. If so, control transfers to FIG. 2E via "D"; otherwise control transfers to block 50.

Figure 2B:
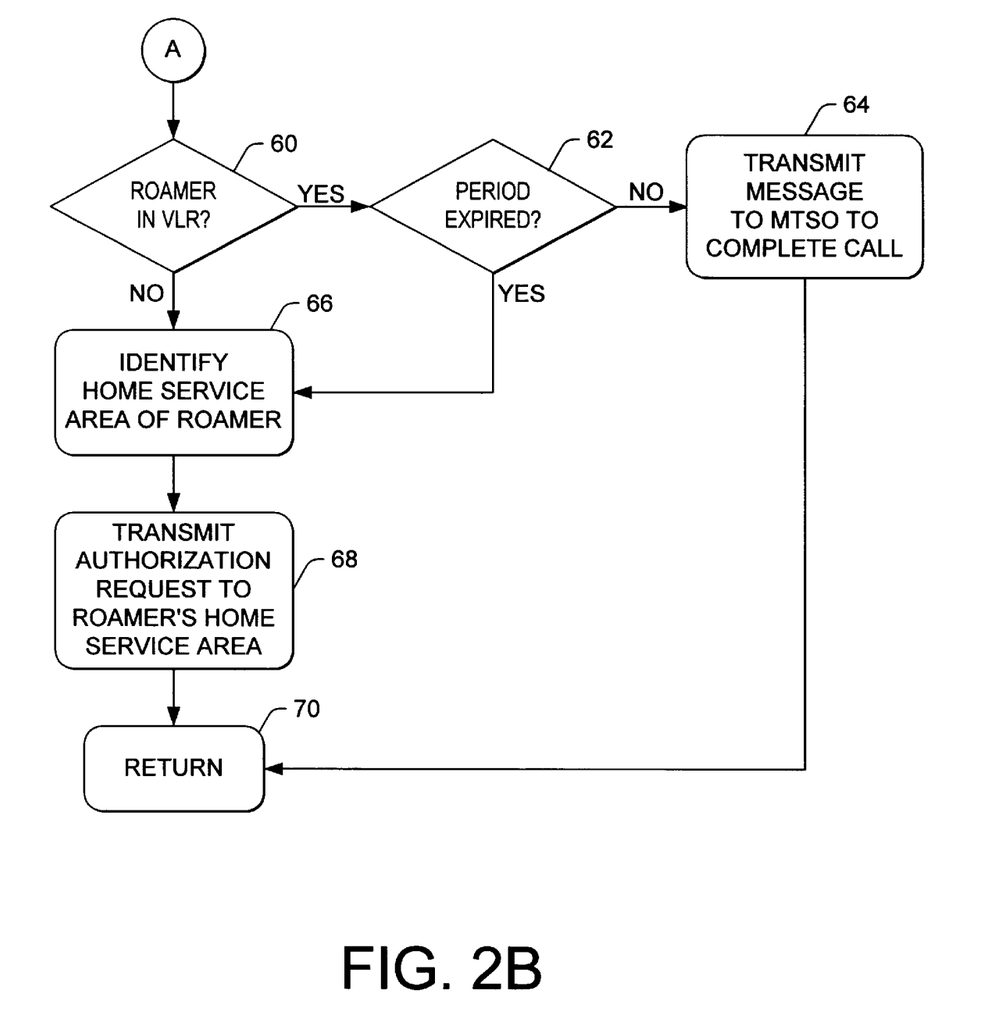

Referring now to FIG. 2B, block 60 is a decision block that represents the service node 34 determining whether the roaming cellular phone 16 is present in the Visitor Locator Register 38, i.e., has been previously authorized for roaming in the home service area 20. If so, control transfers to block 62; otherwise control transfers to block 66. Block 62 is a decision block that represents the service node 34 determining whether the authorization period for the roaming cellular phone 16 in the Visitor Locator Register 38 has expired. If not, control transfers to block 64; otherwise control transfers to block 66. Block 64 represents the service node 34 transmitting a message to the MTSO 18 to complete the call for the roaming cellular phone 16 in the home service area 20, and then control transfers to block 70. Block 66 represents the service node 34 identifying the foreign service area 22, 24, or 26 that is the "home" service area for the cellular phone 16, using the SID received from the cellular phone 16. Block 68 represents the service node 34 transmitting a message to the service node 36, 38, or 40, in the identified foreign service area 22, 24, or 26, requesting authorization for providing cellular services for the roaming cellular phone 16 in the home service area 20. Finally, block 70 returns to FIG. 2A.

Figure 2C:
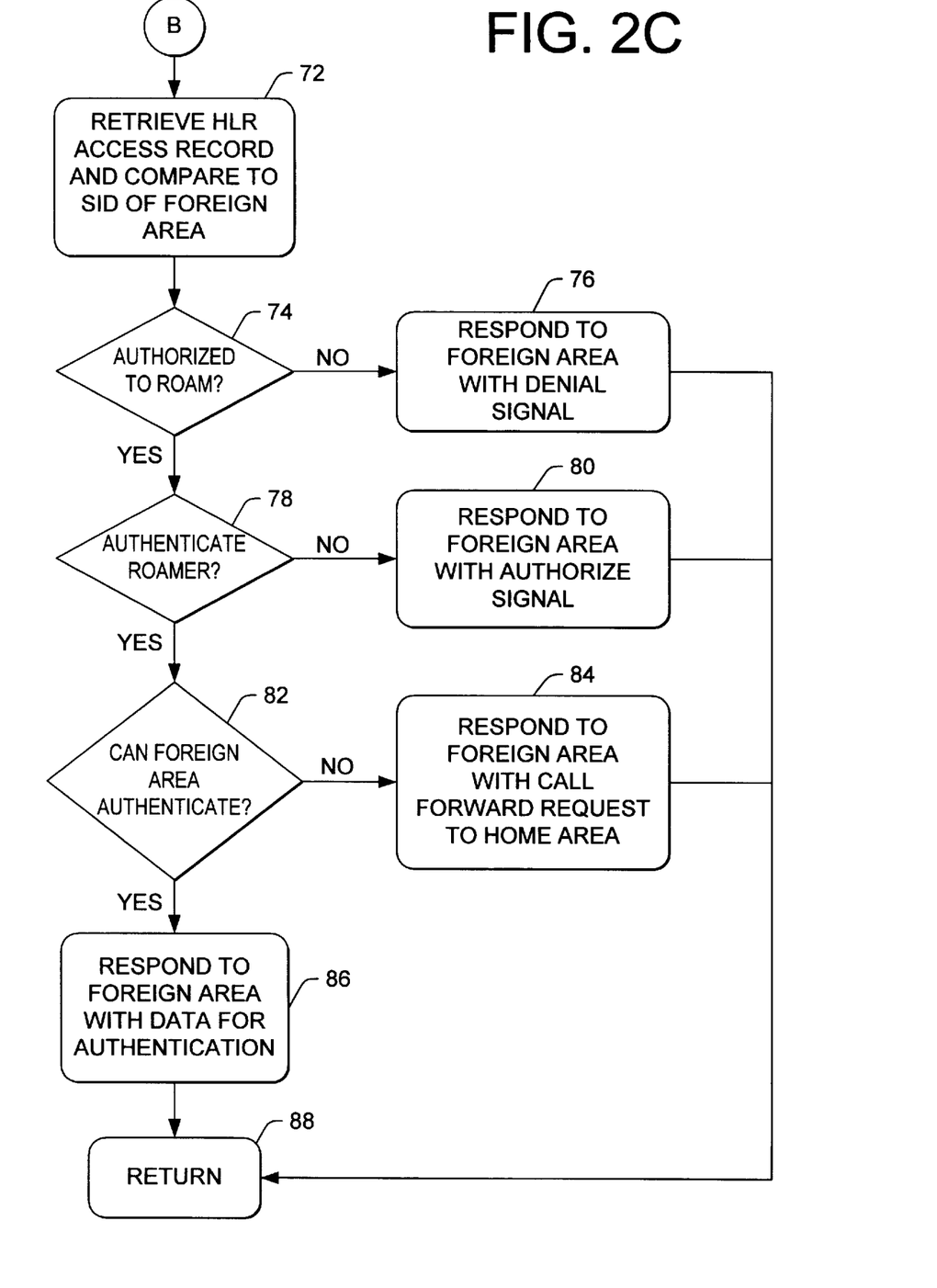

Referring now to FIG. 2C, block 72 represents the service node 34 retrieving a data record from the Home Locator Register 36 associated with the roaming cellular phone 16 that contains the roaming privileges or restrictions for the cellular phone 16 and comparing the data record to the SID of the foreign service area 22, 24, or 26, where the roaming cellular phone 16 is located. Block 74 is a decision block that represents the service node 34 determining, from the data record, whether the roaming cellular phone 16 is authorized to roam in the foreign service area 22, 24, or 26. If not, then control transfers to block 76, which represents the service node 34 responding to the request from the foreign service area 22, 24, or 26, with a denial signal. Otherwise, control transfers to block 78. Block 78 is a decision block that represents the service node 34 determining, from the data record, whether the roaming cellular phone 16 is allowed to roam in the foreign service area 22, 24, or 26, but only after authentication. If not, then control transfers to block 80, which represents the service node 34 responding to request from the foreign service area 22, 24, or 26, with an authorization signal. Otherwise, control transfers to block 82. Block 82 is a decision block that represents the service node 34 determining, from records in its database, whether the foreign service area 22, 24, or 26 has the capability to authenticate the roaming cellular phone 16. If not, control transfers to block 84, which represents the service node 34 responding to the foreign service area 22, 24, or 26, with a call forwarding request, so that the service node 34 can perform the authentication itself. Otherwise, control transfers to block 86. Block 86 represents the service node 34 responding to request from the foreign service area 22, 24, or 26, with an authentication request, including one or more authentication data fields. Finally, block 88 returns to FIG. 2A.

As indicated above, it is envisioned that most, if not all, of the foreign service areas 22, 24, or 26 will have a service node 44, 46, or 48, respectively, that can perform the authentication steps in a manner similar to service node 34. On the other hand, some foreign service areas may not have service nodes for performing the authentication steps. Therefore, it is envisioned that the authentication steps for a roaming cellular phone 16 in another service area could, in fact, be performed by the service node 34 in the home service area 20 via call forwarding.

For example, if authentication were required, but the foreign service area did not have a service node to perform the authentication method, then the service node 34 would respond to the request for validation with a request for the foreign service area to call forward the roaming cellular phone 16 into an interactive voice response unit 42 coupled to the service node 34 of the home service area 20. The service node 34 could then perform the necessary authentication steps before responding to the foreign service area with an authorization signal or a denial signal. Further, the service node 34 could also call forward the roaming cellular phone 16 to their dialed phone number for seamless service. Alternatively, the service node 34 could, through its interactive voice response unit 42, merely instruct the roaming cellular phone 16 that is now authorized to roam in the foreign service area for a specified authorization period, and should re-dial the desired phone number.

Figure 2D:
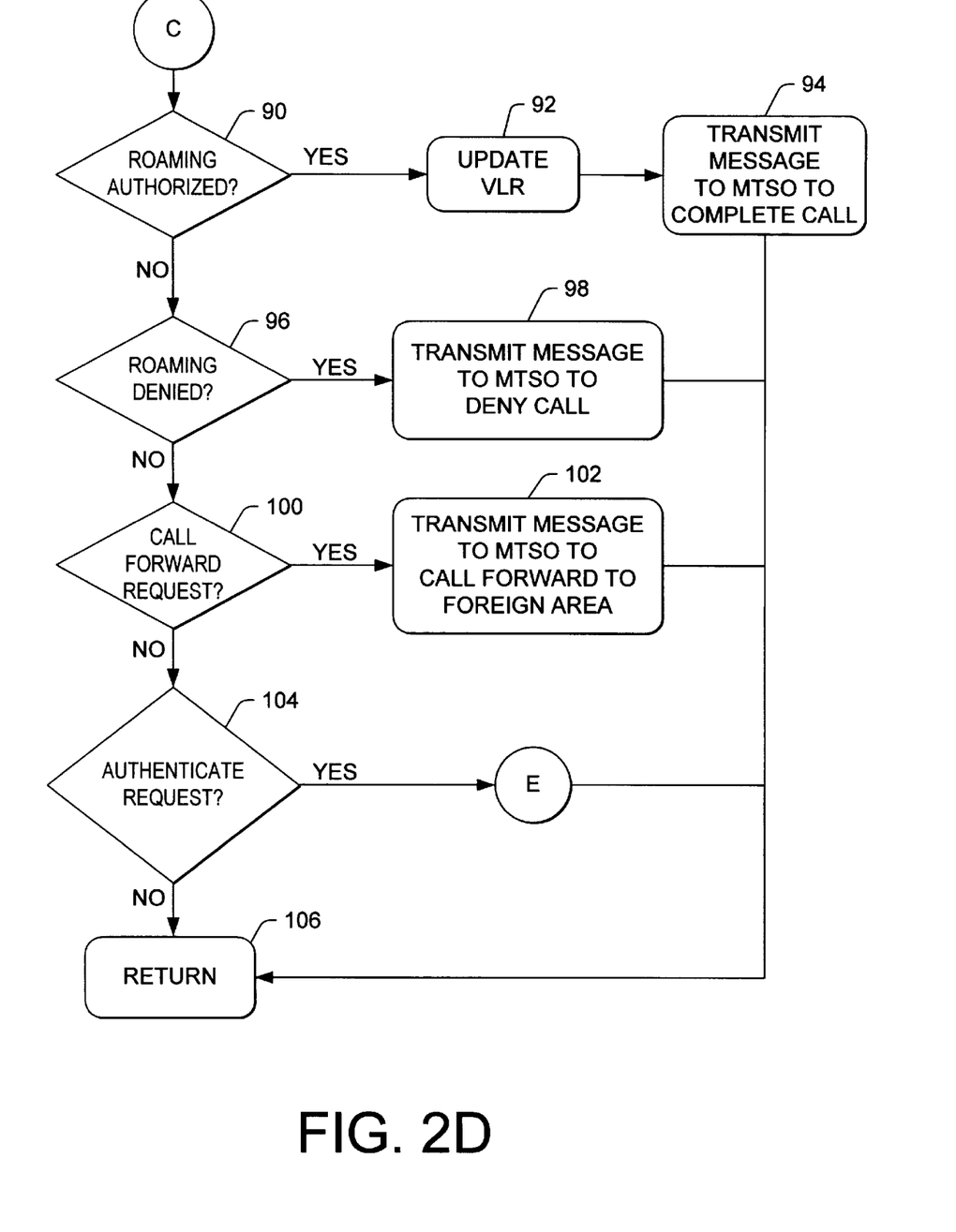

Referring now to FIG. 2D, block 90 is a decision block that represents the service node 34 determining whether the response is an authorization signal for roaming by the cellular phone 16 from the foreign service area 22, 24, or 26. If so, control transfers to block 92, which represents the service node 34 updating its Visitor Locator Register 38 with the authorization and the authorization period and then block 94, which represents the service node 34 returning a response to the MTSO 18 to allow the call to be completed by the roaming cellular phone 16. Otherwise, control transfers to block 96. Block 96 is a decision block that represents the service node 34 determining whether the response is a denial signal for roaming by the cellular phone 16 from foreign service area 22, 24, or 26. If so, control transfers to block 98, which represents the service node 34 returning a response to the MTSO 18 that prevents the call by the roaming cellular phone 16 from being completed. Otherwise, control transfers to block 100. Block 100 is a decision block that represents the service node 34 determining whether the response is a "call forward" request by the foreign service area 22, 24, or 26. If so, control transfers to block 102, which represents the service node 34 returning a response to the MTSO 18 that call forwards the roaming cellular phone 16 to a number indicated by the foreign service area 22, 24, or 26. Otherwise, control transfers to block 104. Block 104 is a decision block that represents the service node 34 determining whether the response is an authentication request by the foreign service area 22, 24, or 26, indicating that authentication is required for the roaming cellular phone 16. If so, control transfers to FIG. 2F via "E"; otherwise, control transfers to block 106. Finally, block 106 returns to FIG. 2A.

Figure 2E:
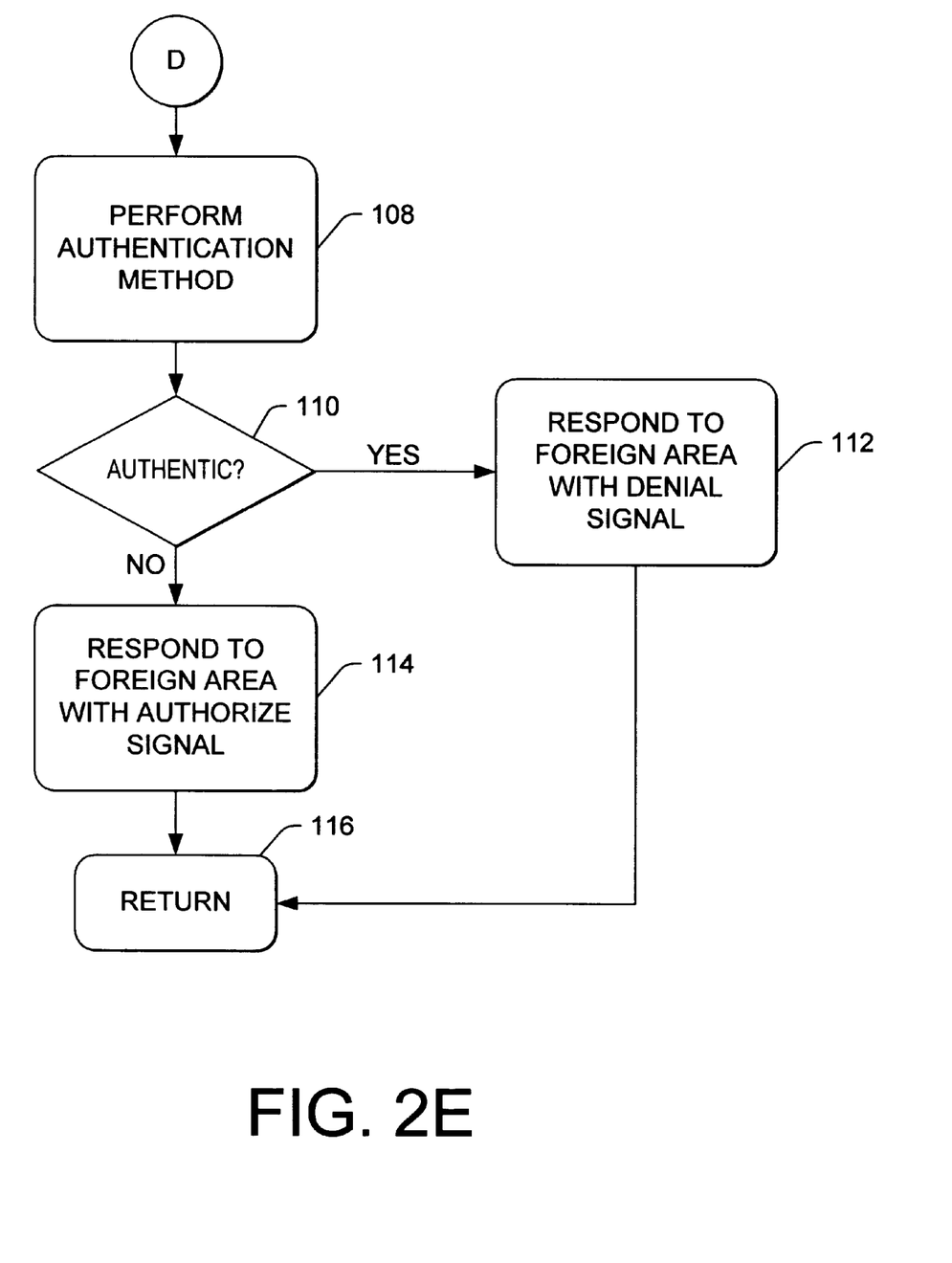

Referring to FIG. 2E, these steps refer to an authentication method performed for a roaming cellular phone 16 in a foreign service area 22, 24, or 26. In this case, the roaming cellular phone 16 has been call-forwarded to the service node 34 for authentication, because the foreign service area 22, 24, or 26 lacks the capability to perform the authentication method. Block 108 represents the service node 34 retrieving the authentication data from the Home Locator Register 36 and performing the authentication method using the authentication data. Generally, the Home Locator Register 36 will contain one or more different data items therein for use with one or more authentication methods. In one example, an authentication data field received from the foreign service area 22, 24, or 26 may contain a PIN for the roaming cellular phone 16 and the service node 34 couples the call to its interactive voice response unit 42, requests manual entry of the PIN, and then waits for a correct response indicating authentication. In another example, the authentication data may contain other identifying information, e.g., the subscriber's social security number or the subscriber's mother's maiden name or other identifying data. Such other identifying information may be used in place of the PIN, or may be used in a tiered authentication method in conjunction with the failure of roaming cellular phone 16 to enter a correct PIN. Using the identifying information, the service node 34 couples the call to the operator position 40, wherein an operator queries the subscriber across a voice channel in an attempt to authenticate their identity. If such attempts are successful, then the operator at the operator position 40 so informs the service node 34 via data entry into the service node 34. Of course, those skilled in the art will recognize that any number of different authentication methods could be used without departing from the scope of the present invention. Indeed, the present invention is capable of implementing any number of different types of authentication. Block 110 is a decision block that represents the service node 34 determining whether the roaming cellular phone 16 was authenticated. If not, control transfers to block 112, which represents the service node 34 returning a denial signal to the foreign service area 22, 24, or 26. Otherwise, control transfers to block 114, which represents the service node 34 returning a authorization signal to the foreign service area 22, 24, or 26. Finally, block 116 returns to FIG. 2A.

Figure 2F:
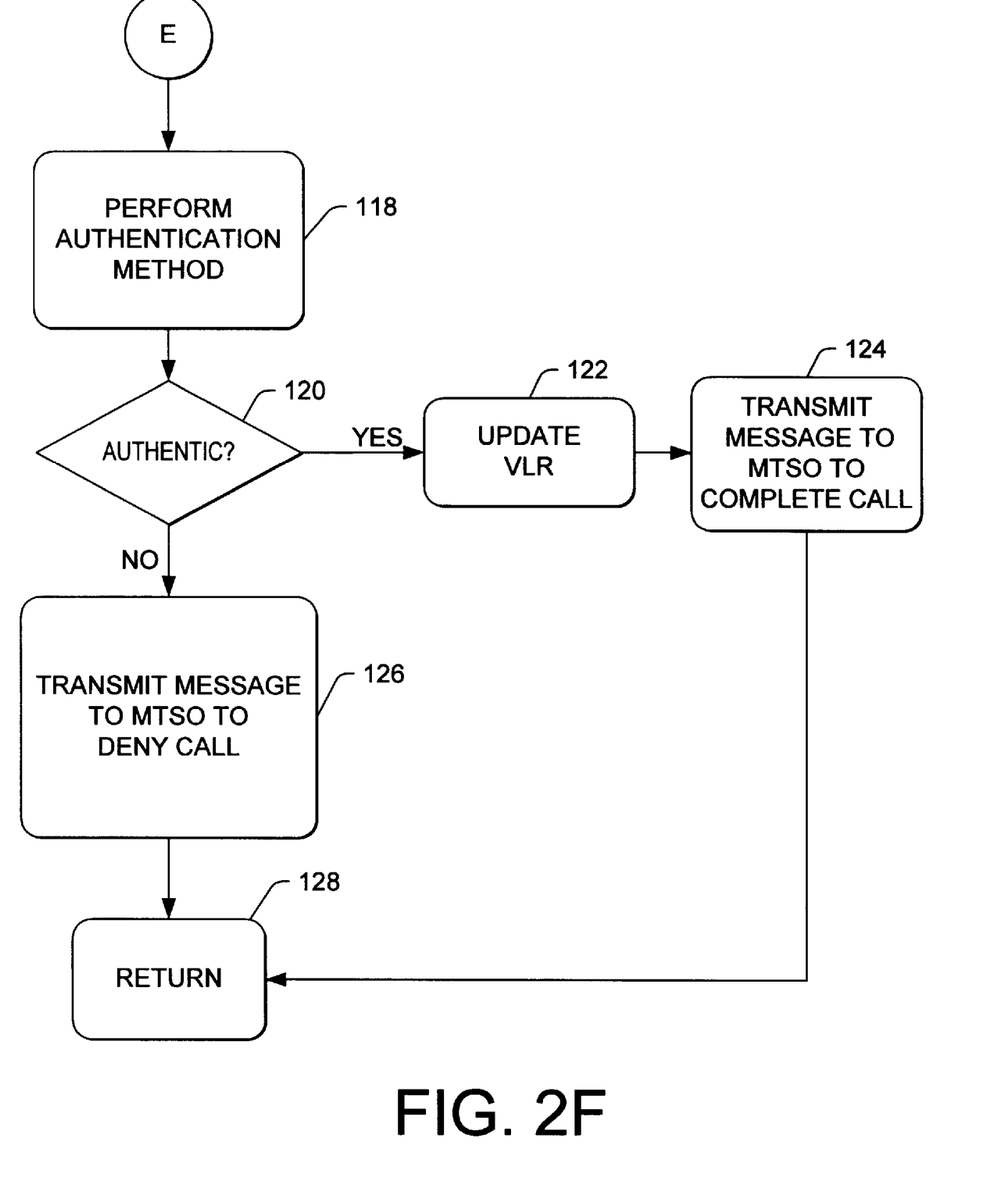

Referring to FIG. 2F, these steps refer to an authentication method performed for a roaming cellular phone 16 in the home service area 20, in response to a response from a foreign service area 22, 24, or 26. Generally, the response from the foreign service area 22, 24, or 26, will contain one or more data fields for use with one or more authentication methods, as described above. Block 120 is a decision block that represents the service node 34 determining whether the roaming cellular phone 16 was authenticated. If so, control transfers to block 122, which represents the service node 34 updating its Visitor Locator Register 38 with the authorization and the authorization period, and then to block 124, which represents the service node 34 transmitting a message to the MTSO 18 that allows the call to be completed by the roaming cellular phone 16. Otherwise, control transfers to block 126, which represents the service node 34 transmitting a message to the MTSO 18 that prevents the call from being completed by the roaming cellular phone 16. Finally, block 128 returns to FIG. 2D.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for preventing roaming fraud in a cellular telephone system, comprising the steps of:
   (a) receiving a request to authorize a call attempt by a cellular phone in a foreign service area;
   (b) determining whether the call attempt by the cellular phone exceeds a roaming privilege of the cellular phone, the determining step comprising the step of checking a database stored in a data storage device to determine the roaming privilege of the cellular phone, the database comprising a Home Locator Register (HLR) for storing roaming information for subscribers of the home service area;
   (c) authenticating the cellular phone using secondary identification data when the call attempt exceeds the roaming privilege for the cellular phone; and
   (d) authorizing the call attempt by the cellular phone in the foreign service area when a proper response is provided by the cellular phone at the authenticating step.

2. The method of claim 1 above, wherein the roaming information comprises the roaming privileges.

3. The method of claim 1 above, wherein the roaming information comprises the secondary identification data for the subscriber.

4. The method of claim 1 above, further comprising denying access to the cellular service if the cellular phone has no roaming priviledge.

5. The method of claim 1 above, further comprising allowing access to the cellular service if the cellular phone has not exceeded its roaming privilege.

6. The method of claim 1 above, wherein the authenticating step comprises the steps of:
   determining that the cellular phone does not have sufficient roaming privileges, but is not prevented from roaming; and
   transmitting an authentication request signal to the foreign service area, wherein the foreign service area performs the authentication step using the secondary identification data to authorize the call attempt.

7. The method of claim 1 above, wherein the authenticating step comprises the steps of forwarding the call attempt to the foreign service area and verifying that the foreign service area authorized the call attempt.

8. The method of claim 1 above, wherein the authorizing step comprises the step of authorizing the providing of service to the cellular phone for a specified amount of time.

9. A method for preventing roaming fraud in a cellular telephone system comprising the steps of:
   (a) receiving a request to authorize a call attempt by a cellular phone in a home service area;
   (b) determining whether the call attempt by the cellular phone exceeds a roaming privilege of the cellular phone, the determining step comprising the step of checking a database stored in a data storage device to determine the roaming privilege of the cellular phone, the database comprising a Visitor Locator Register (VLR) for storing roaming information for subscribers of a foreign service area that are currently roaming in the home service area;
   (c) authenticating the cellular phone using secondary identification data when the call attempt exceeds the roaming privilege for the cellular phone; and
   (d) authorizing the call attempt by the cellular phone in the home service area when a proper response is provided by the cellular phone at the authenticating step.

10. The method of claim 9 above, wherein the VLR further comprises roaming information for subscribers of the foreign service area that are authorized for service in the home service area.

11. The method of claim 9 above, wherein the authorization step comprises completing the call request if the cellular phone is found in the VLR.

12. The method of claim 9 above, wherein the determining step comprises the steps of sending a request to a foreign service area, the foreign service area checking a database stored in a data storage device to determine the roaming privilege of the cellular phone in response thereto.

13. The method of claim 9 above, wherein the roaming information comprises a validation period indicating how long the roaming cellular phone is authorized for service in the home service area.

14. The method of claim 9 above, wherein the authenticating step comprises the step of transmitting an authentication request signal to the foreign service area, wherein the foreign service area provides in response thereto the secondary identification data to be used during the authorization step.

15. The method of claim 9 above, wherein the authorizing step further comprises adding the cellular phone to the database.

16. An apparatus for preventing roaming fraud in a cellular telephone system, comprising:
   (a) means for receiving a request to authorize a call attempt by a cellular phone, comprising means for authorizing the call attempt by the cellular phone in a foreign service area;
   (b) means for determining whether the call attempt by the cellular phone exceeds a roaming privilege of the cellular phone, comprising means for checking a database stored in a data storage device to determine the roaming privilege of the cellular phone, the database comprising a Home Locator Register (HLR) for storing roaming information for subscribers of the home service area;
   (c) means for authenticating the cellular phone using secondary identification data when the call attempt exceeds the roaming privilege for the cellular phone; and
   (d) means for authorizing the call attempt by the cellular phone in the foreign service area when a proper response is provided by the cellular phone.

17. The apparatus of claim 16, wherein the roaming information comprises the roaming privileges.

18. The apparatus of claim 16, wherein the roaming information comprises the secondary identification data for the subscriber.

19. The apparatus of claim 16, wherein access to the cellular service is denied if the cellular phone has no roaming privilege.

20. The apparatus of claim 16, wherein access to the cellular service is allowed if the cellular phone has not exceeded its roaming privilege.

21. The apparatus of claim 16, wherein the means for authenticating comprises:

means for determining that the cellular phone does not have sufficient roaming privilege, but is not prevented from roaming; and means for transmitting an authentication request signal to the foreign service area, wherein the foreign service area performs the authentication step using the secondary identification data to authorize the call attempt.

22. The apparatus of claim 16, wherein the means for authenticating comprises means for forwarding the call attempt to the foreign service area and means for verifying that the foreign service area authorized the call attempt.

23. The apparatus of claim 16, wherein the means for authorizing comprises means for authorizing the providing of service to the cellular phone for a specified amount of time.

24. A program storage device readable by a computer and tangibly embodying a program of instructions executable by the computer to perform method steps for preventing roaming fraud in a cellular telephone system, the method comprising the steps of:

(a) receiving a request to authorize a call attempt by a cellular phone, comprising the step of authorizing the call attempt by the cellular phone in a foreign service area;

(b) determining whether the call attempt by the cellular phone exceeds a roaming privilege of the cellular phone, the determining step comprising the step of checking a database stored in a data storage device to determine the roaming privilege of the cellular phone, the database comprising a Home Locator Register (HLR) for storing roaming information for subscribers of the home service area;

(c) authenticating the cellular phone using secondary identification data when the call attempt exceeds the roaming privilege for the cellular phone; and (d) authorizing the call attempt by the cellular phone in the foreign service area when a proper response is provided by the cellular phone at the authenticating step.

25. The program storage device of claim 24, wherein the roaming information comprises the roaming privileges.

26. The program storage device of claim 24, wherein the roaming information comprises the secondary identification data for the subscriber.

27. The program storage device of claim 24, further comprising denying access to the cellular service if the cellular phone has no roaming privilege.

28. The program storage device of claim 24, further comprising allowing access to the cellular service if the cellular phone has not exceeded its roaming privilege.

29. The program storage device of claim 24, wherein the authenticating step comprises the steps of:

determining that the cellular phone does not have sufficient roaming privilege, but is not prevented from roaming; and transmitting an authentication request signal to the foreign service area, wherein the foreign service area performs the authentication step using the secondary identification data to authorize the call attempt.

30. The program storage device of claim 24, wherein the authenticating step comprises the steps of forwarding the call attempt to the foreign service area and verifying that the foreign service area authorized the call attempt.

31. The program storage device of claim 24, wherein the authorizing step comprises the step of authorizing the providing of service to the cellular phone for a specified amount of time.

* * * * *